UNITED STATES PATENT OFFICE.

HERBERT H. DOW, OF MIDLAND, MICHIGAN, AND WALTER S. GATES, OF WORTHINGTON, ONTARIO, CANADA, ASSIGNORS TO THE ONTARIO NICKEL COMPANY, LIMITED, OF WORTHINGTON, CANADA, A CORPORATION OF CANADA.

PROCESS OF PURIFYING PRECIPITATES.

No. 883,792.     Specification of Letters Patent.     Patented April 7, 1908.

Application filed November 6, 1907. Serial No. 401,003.

*To all whom it may concern:*

Be it known that we, HERBERT H. DOW and WALTER S. GATES, both citizens of the United States, residents of Midland, county of Midland, and State of Michigan, and Worthington, District of Algoma, and Province of Ontario, Canada, respectively, have invented a new and useful Improvement in Processes of Purifying Precipitates, of which the following is a specification, the principle of the invention being herein explained, and the best mode in which we have contemplated applying that principle, so as to distinguish it from other inventions.

Our invention relates to processes of separating metals and especially to the separation of the same, each substantially free of all the others, when contained in a water solution.

The underlying principle of operation as well as, in a sense, the general course of procedure of the present method is closely related to that forming the subject matter of our pending application, Serial No. 300,728, filed February 12, 1906. Thus the improved results obtained by the present process are effected by reason of the same fact which we have discovered and have utilized in such other process, namely that when a reagent, which is capable of precipitating at least one of the metals as an insoluble compound, is added to a solution of metals—more or less of the insoluble compounds of the other metals are simultaneously precipitated, depending upon the circumstances of each particular case—if the degrees of insolubility of the insoluble compounds thus precipitated are different and vary among themselves within reasonable limits, and there be present in the original solution enough of the metal, which upon the addition of the reagent forms the more insoluble compound, to be at least a chemical equivalent of the reagent; then, the more insoluble precipitate is purified of its inclusions of the slightly less insoluble precipitates of the other metals by subjecting the original solution and precipitates to a prolonged agitation by means of which the soluble compound of the metal forming the more insoluble precipitate reacts with the precipitates of the other metals to form soluble compounds of said other metals and more of the insoluble precipitate which is being purified. We find a particular application for our improved process in the separating of iron, copper and nickel from each other, either in the form of precipitates or solutions substantially free of the others, when all are contained in the same original water solution.

We are aware that iron, copper and nickel have been taken from a water solution in the same order and by the same reagents that we use, but we are not aware that products anywhere nearly pure have been obtained in the manner embodying our improved process. However, in fact we do know that large amounts of the valuable metals have been lost in the iron precipitate in other processes. The fact is well-known that, if two metals are present in a solution, and one of the metals forms a precipitate, or an insoluble compound, more insoluble than the corresponding compound of the second metal, and there is added to the solution the proper amount of a reagent capable of throwing down the first metal as a precipitate, then said precipitate will in many cases carry down with it in insoluble form part of the second metal. This will happen, first, always in case the second metal is also capable of being precipitated by the reagent which is used, and, secondly, often even if said second metal is not capable of being so precipitated. As an example of the first case, if a solution of iron and nickel is treated with calcium hydrate, which reagent will precipitate either metal alone, and the reagent is added in the proper amount to precipitate the iron, the iron precipitate will always carry down some insoluble nickel. As an example of the second case, if a solution of iron and nickel, with ammonium chlorid present, be treated with ammonium hydrate, which reagent will precipitate iron alone with ammonium chlorid, but which will not precipitate nickel alone with ammonium chlorid, and the reagent be added in the proper amount to precipitate the iron, the iron precipitate will always carry down some insoluble nickel. In both of these cases, if the nickel were not present in the original solution in an amount much greater than the iron, the iron will predominate in the precipitate because ferric hydrate is more insoluble than nickel hydrate. The usual way in which these precipitations would be made in the laboratory would be to add to the solution of iron and nickel in a beaker the proper amount of reagent and agitate by means of a stirring rod until the mixture became homogeneous and then stop, the idea being that the precipitation of a certain amount of nickel in the iron was unavoidable and irremediable except, of course, by the use of some solvent (such as ammonium hydrate) which will dissolve nickel precipitates but will not dissolve iron precipitates. We are not aware that it has been known that a slow subsequent action is possible by agitating the mixture in the presence of an excess of soluble salt of the metal forming the more insoluble precipitate, in this case iron.

It has always been considered impossible to get the iron out free of copper and nickel and in fact has been considered necessary to take out the iron by means of a weak alkali (followed by a strong alkali for the nickel) or else the iron precipitate would contain a very large amount of nickel. By our improved method the iron may be precipitated by as strong an alkali as is used for the nickel, in fact all three metals, iron, copper and nickel, may be removed by the same reagent which may be strong or weak. The old method of purifying such a precipitate of the included metal, such, for instance, as the purifying of ferric hydrate of inclusion of nickel hydrate, is to separate the precipitate from the solution, dissolve it, for instance in an acid, and then re-precipitate with a proper amount of a suitable reagent, whereby all the iron is again thrown down and containing some nickel, but not so much of the latter as before, the difference of nickel being left in the second filtrate. The reason why the nickel exists in the second filtrate in less quantities than it does in the first is because in the acid solution it is in a more disseminated condition with regard to the iron than it was in the original solution, there being less nickel present, and only part of the nickel present being thrown upon each time. Therefore a sufficient number of separations in sufficiently dilute solutions will accomplish a quantitative separation, giving all the nickel in the united filtrate which will be very dilute. This method is commonly used in quantitative analysis, and ordinarily four separations under good conditions are sufficient.

Both of our improved processes, as ordinarily practiced, while giving practically pure products, do not at one time remove from the material being treated all of the metal whose separation is sought, because of the fact that the precipitate or solution as the case may be, is afterwards purified by agitation in a solution, or with a precipitate, containing an excess of the soluble salt of the metal which is being purified. The first of these general processes, which we need not more than outline here, is in effect a method of fractional precipitation from the solution of the respective metals contained therein, and the subsequent purification or such fractional precipitates. Thus, in the first method under such process a solution of iron, copper and nickel is agitated with a reagent in amount equal to the chemical equivalent of the metal which it is desired to first separate out, or in the case in hand, of the iron, such reagent being, for example, powdered limestone. The result is the almost immediate precipitation of most of the iron as an hydrate, but even in a dilute solution there is some copper and nickel thrown down as basic carbonates. A prolonged agitation of the precipitates in the original solution purifies the iron precipitate of the included copper and nickel basic carbonates because of the comparative solubilities of the ferric hydrate and said basic carbonates, according to the following order of insolubility:

Most insoluble, $FeO_3H_3$,
Less insoluble, $CuCO_3.CuO_2H_2$, and $CuO_2H_2$,
Least insoluble, $NiCO_3.NiO_2H_2$, and $NiO_2H_2$.

The excess of iron salt in solution thus slowly dissolves, under the effect of vigorous agitation, the copper and nickel basic carbonate contained in the insoluble ferric hydrate, and precipitates in turn more ferric hydrate. For instance, suppose the original solution consists of the chlorids of iron, copper and nickel, then the following reactions take place:

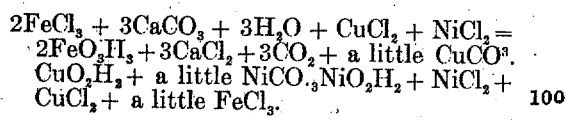

$3CuCO_3.CuO_2H_2 + 4FeCl_3 + 3H_2O$ agitated $=$
$6CuCl_2 + 3CO_2 + 4FeO_3H_3$.

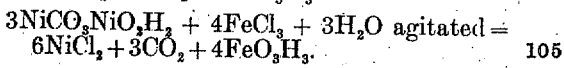

After a prolonged agitation with a proper amount of reagent, the ferric hydrate is found to be substantially free of the included copper and nickel basic carbonates and the solution is found to be free of iron. The precipitate is separated and washed by any convenient method from the copper and nickel solution, the latter going into any suitable container. This copper and nickel solution is agitated with calcium hydrate to the chemical equivalent of the copper present, the result being the almost immediate precipitation of most of the copper as hydrate, which latter contains some nickel as hydrate. A prolonged agitation of this impure copper precipitate in the copper and nickel solution will purify said precipitate of the nickel because of the comparative solubilities of the precipitated hydrates. The excess of the soluble copper salt in the original solution thus slowly dissolves the nickel hydrate contained in the insoluble cupric hydrate and precipitates in turn more cupric hydrate. The reactions are as follows:

$$CuCl_2 + NiCl_2 + CaO_2H_2 = CuO_2H_2 + CaCl_2 + NiCl_2 \text{ a little } CuCl_2 + \text{a little } NiO_2H_2.$$

$$NiO_2H_2 + CuCl_2 \text{ agitated} = CuO_2H_2 + NiCl_2.$$

After a prolonged agitation with the proper amount of calcium hydrate the cupric hydrate is found to be substantially free of the nickel hydrate and the solution is free of copper. The cupric hydrate is separated and washed from the nickel solution, the latter going into any suitable container. This nickel solution is treated with suitable reagent, such as calcium hydrate, the result being the almost immediate precipitation of all of the nickel present, free from the iron and copper, without prolonged agitation, the reaction being:

$$NiCl_2 + CaO_2H_2 = NiO_2H_2 + CaCl_2.$$

Such first method as above described will be seen to involve in effect the starting with a solution of all the metals, precipitating therefrom the less soluble metal by adding reagent in amount equal to the chemical equivalent of such metal, and then purifying this precipitate by agitation of the resultant mixture. Two other methods, or sub-processes, under the same general process may be more briefly described. The first involves starting with a solution of all the metals as before, precipitating therefrom the less soluble metal by adding reagent in an amount less than the chemical equivalent, purifying this precipitate by agitation of the resultant mixture, and thereupon precipitating the remaining portion of such less soluble metal by addition of an excess of reagent to the solution. So, too, the third involves starting with a solution of all the metals, from which, however, the less soluble metal is precipitated by adding reagent in an amount sufficient to actually precipitate all of such metal, this precipitate being thereupon purified by agitating the same in another portion of the original solution.

The companion process to the one forming the subject matter of the present application has been thus rather fully described for the reason that the latter is quite closely related to the former as will be seen. Such process, then, consists of the steps hereinafter fully described and specifically pointed out in the claims, such description setting forth in detail certain modes of carrying out the invention which, however, constitute but a part of the various ways in which the principle of the invention may be used. Such principle may be generally characterized as a fractional dissolution of precipitates of the several metals which it is desired to separate one from the other, which precipitates are intermingled so as to form a common mass. This process, as the other, involves starting with a solution of all the metals from which such metals are all precipitated together in one promiscuous mass. This mass of precipitates, however, constitutes in effect the actual starting point of the process and shall be so referred to hereafter. Corresponding, then, to the first method of the companion process, the precipitates of iron, copper and nickel are agitated in any suitable vessel with a solution containing a soluble iron salt, e. g. iron chlorid, in amount equal to the chemical equivalent of the nickel present in the solution, the result of which is the dissolution of most of the nickel with a consequent formation of additional precipitate. A prolonged agitation of the mixture will effect a completion of this interchange because of the comparative solubilities of the ferric hydrate and the basic carbonates of copper and nickel which it is desired to have dissolved according to the same order of insolubility as that previously given. The excess of iron salt in solution thus slowly dissolves, under the effect of vigorous agitation, the nickel basic carbonate that is intermingled with insoluble ferric hydrate, and copper basic carbonate, and precipitates in turn more ferric hydrate. For instance, suppose the original mass of precipitates consists of ferric hydrate and basic carbonates of copper and nickel, then the following reaction takes place:

$$3NiCO_3 \cdot NiO_2H_2 + 4FeCl_3 + 3H_2O \text{ agitated} = 6NiCl_2 + 3CO_2 + 4FeO_3H_3.$$

After a prolonged agitation with a proper amount of reagent the nickel basic carbonate will be found to be substantially dissolved out and the solution to be practically free of iron. The precipitate is separated and washed by any convenient method from the nickel solution, the latter going into any suitable container. This residual precipitate, which it will now be seen contains iron and copper alone, is next agitated with a solution containing soluble salts of iron added in amount equal to the chemical equivalent of the copper present. A prolonged agitation of the resulting mixture will now result in effecting the solution of the copper precipitate with an attendant deposition of iron, the reaction being as follows:

$$3CuCO_3 \cdot CuO_2H_2 + 4FeCl_3 + 3H_2O \text{ agitated} = 6CuCl_2 + 3CO_2 + 4FeO_3H_3.$$

Upon separating out the final precipitate and washing it as before from the copper solution, practically all the copper will be had in pure form and entirely apart from the iron. It will be understood, of course, that the pure nickel and copper solution obtained as described above will be treated with a suitable reagent such as calcium hydrate, the result being the almost immediate precipitation of the nickel or copper present, as the case may be. In the form of pure precipitates they may then be further treated so as either to reduce them to the metallic state or to obtain commercial compounds, as may be desired.

The second method of accomplishing the separation of iron, copper and nickel by means of our new process consists in adding to a portion of the intermingled precipitates, with which the process proper begins, less than the chemical equivalent of a solution containing soluble salts of the less soluble metal, agitating the resulting mixture until a corresponding amount of nickel is dissolved and its place taken by iron precipitates. The solution after such agitation will obviously contain nothing but nickel. To the precipitate then remaining additional iron solution is added in an amount slightly in excess of that which is required as a chemical equivalent of the remaining copper and nickel, thus dissolving the balance of the nickel as an impure solution containing also some copper. This impure solution is then removed and put with another quantity of the original precipitate which of course contains an excess of nickel precipitate. By agitation with such precipitate the copper in the solution is replaced by nickel and a pure solution of the latter is obtained. The same course of procedure is then followed in treating the precipitate, after the removal, as above, of the nickel, in order to separate the copper from the iron.

The third method of separating iron, copper and nickel, corresponding with the third method of the companion process, consists in adding to a portion of the original, or intermingled precipitate, a quantity of a solution containing soluble salts of the iron in an amount greater than the chemical equivalent of the nickel. By prolonged agitation, all the nickel will be dissolved out and with it a portion of the copper. From the resultant impure solution the copper is thereupon eliminated by agitation with a fresh quantity of the original precipitate. The presence in the latter of an excess of nickel precipitate quickly effects a deposition of the copper, leaving the solution of nickel substantially pure. As before, a repetition of the steps just outlined in connection with the residual precipitate will be effective in separating the copper from the iron.

Of course it will be remembered that the separation takes place as well with the salts of the other mineral acids and mixtures as it does with the chlorid solutions.

In the above description and the following claims we mean to include in the term "iron" the metal in both conditions of oxidation. We mean to include in the term "nickel" the nickel group of similar metals, viz. nickel and cobalt alone and together. We mean by the term "prolonged agitation" agitation for a length of time greater than that ordinarily required by a chemical reagent to act on a solution which is capable of being precipitated by it, and make the resulting mixture homogeneous. We mean by the term "chemical equivalent of a reagent" such an amount of that reagent as actually and finally enters into the reaction, since the cores of some particles of insoluble reagent might not react and it would be necessary, therefore, to add the reagent in a quantity in excess of that representing the theoretical chemical equivalent. We mean by the term "insoluble precipitates" those that are more insoluble than the hydrates of barium and calcium, for instance, the hydrates and carbonates of iron, aluminium, copper, nickel, etc.

If, at any time, more of the reagent is added than the chemical equivalent of the metal to be precipitated, the condition of equilibrium can be restored by the addition of more of the original solution, which amounts, in effect, to the adding of the chemical equivalent.

Our process does not give dilute solutions at any stage, and yet we obtain final pure solutions of the iron, copper and nickel, instead of the impure products that are obtained by present methods, and the basic principle of our process is the separation of one precipitated metal from another slightly less soluble metal, both precipitates being substantially insoluble—although nothing is absolutely insoluble in a solvent—by means of agitating such intermingled precipitates with a solution containing soluble salts of the less soluble metal. We do not, of course, confine ourselves to the use of water as a solvent for obtaining the original solutions. Where both or all of the metals in solution are capable of being precipitated by the reagent used, there has been often left and lost as much as 25% impurity, for instance, of nickel in the iron; whereas we are able, by our method, to free the iron precipitate entirely of the nickel by a sufficiently long and vigorous agitation. Our method, of course, works best on substances which, although insoluble, are colloidal and freely disseminated, since, thus, infinitely great surfaces are constantly presented for solution and subsequent immediate action of the soluble salt.

We wish to point out that, if the addition of the required amount of reagent be made so gradually that it extends over a considerable length of time during which agitation is going on, this amounts in substance to "adding the required amount of reagent and then subjecting the mixture to prolonged agitation."

Other modes of applying the principle of our invention may be employed instead of the one explained, change being made as regards the process herein disclosed, provided the step or steps stated by any one of the following claims or the equivalents of such stated step or steps be employed.

We therefore particularly point out and distinctly claim as our invention:—

1. In a process of separating one metal from another, such metals being in the form of precipitates differing slightly in their respective degrees of solubility, the steps which consist in adding to the precipitates a solution containing a soluble salt of the metal forming the less soluble precipitate in an amount greater than the chemical equivalent of the metal forming the more soluble precipitate; and then agitating the resulting mixture until such latter metal is substantially dissolved out.

2. In a process of separating one metal from another, such metals being in the form of precipitates one of which is relatively insoluble, the steps which consist in adding to the precipitates a solution containing a soluble salt of the metal forming such relatively insoluble precipitate in an amount greater than the chemical equivalent of the other metal; and then agitating the resulting mixture until such latter metal is substantially dissolved out.

3. In a process of separating one metal from another, such metals being in the form of substantially insoluble precipitates, one precipitate, however, being slightly less soluble than the others, the steps which consist in adding to the precipitates a solution containing a soluble salt of the metal forming such less soluble precipitate in an amount sufficient to actually dissolve all of the metal forming the more soluble precipitate; and then agitating the resulting mixture until such latter metal is substantially dissolved out.

4. In a process of separating one metal from another, such metals being in the form of substantially insoluble precipitates, one precipitate, however, being slightly less soluble than the others, the steps which consist in adding to the precipitates a solution of the metal forming the less soluble precipitate in an amount sufficient to actually dissolve all of the metal forming the more soluble precipitate; and then agitating the resulting mixture until the latter metal is substantially dissolved out.

5. In a process of separating one metal substantially free from another, such metals being in the form of precipitates differing slightly in their respective degrees of solubility, the steps which consist in repeating the following cycle of operations until each metal has been successively separated out: adding to the precipitates a solution of a soluble salt of the metal forming the less soluble precipitate in an amount sufficient to actually dissolve all of the metal forming the more soluble precipitate; agitating the resulting mixture until such latter metal is dissolved out; and then separating the solution from the residual precipitate.

6. In a process of separating one metal substantially free from another, such metals being in the form of precipitates differing slightly in their respective degrees of solubility, the steps which consist in adding to the precipitates a solution containing a soluble salt of the metal forming the less soluble precipitate in an amount greater than the chemical equivalent of the metal forming the more soluble precipitate; agitating the resulting mixture until such latter metal is dissolved out; separating the solution from the residual precipitate; and then purifying such solution of any inclusions of the less soluble metal by agitating the same with another portion of the original precipitate.

7. In a process of separating one metal substantially free from another, such metals being in the form of precipitates differing slightly in their respective degrees of solubility, the steps which consist in repeating the following cycle of operations until each metal has been successively separated out: adding to the precipitates a solution of a soluble salt of the metal forming the less soluble precipitate in an amount sufficient to actually dissolve all of the metal forming the more soluble precipitate; agitating the resulting mixture until such latter metal is dissolved out; separating the solution from the residual precipitate; and then purifying such solution of any inclusions of the less soluble metal.

8. In a process of separating one metal substantially free from another, such metals being in the form of precipitates differing slightly in their respective degrees of solubility, the steps which consist in adding to the precipitates a solution of the metal forming a less soluble precipitate in an amount sufficient to actually dissolve the metal forming the more soluble precipitate; agitating the resulting mixture until such latter metal is dissolved out; separating the solution from the residual precipitate; purifying such solution of any inclusions of the less soluble metal by agitating the same with another portion of the original precipitate; and then repeating the foregoing series of steps with such residual precipitate until all of the metals are separated.

9. In a process of separating iron and nickel in the form of precipitates differing slightly in their respective degrees of solubility, the steps which consist in adding to the precipitates a solution of the iron in an amount sufficient to actually dissolve all of the nickel; and then agitating the resulting mixture until such nickel is dissolved out.

10. In a process of separating iron and nickel in the form of precipitates differing slightly in their respective degrees of solubility, the steps which consist in adding to the precipitates a solution containing a soluble salt of the iron in an amount sufficient to actually dissolve all of the nickel; agitating the resulting mixture until the nickel is substantially dissolved out; separating the solution from the residual precipitate; and then purifying such solution of any inclusions of the iron.

11. In a process of separating iron and nickel in the form of substantially insoluble precipitates, the iron precipitate, however, being slightly less soluble than the nickel precipitate, the steps which consist in adding to the precipitates a solution containing a soluble salt of the iron in an amount greater than the chemical equivalent of the nickel; agitating the resulting mixture until the nickel is substantially dissolved out; separating the solution from the residual precipitate; and then purifying such solution of any inclusions of the iron by agitating the same with another portion of the original precipitate.

12. In a process of separating iron, copper, and nickel in the form of precipitates differing slightly in their respective degrees of solubility, such precipitates being more soluble in the order named, the steps which consist in adding to the precipitates a solution containing a soluble salt of a metal forming a less soluble precipitate in an amount greater than the chemical equivalent of the nickel; agitating the resulting mixture until the nickel is substantially dissolved out; separating the solution from the residual precipitate, and purifying the same of any inclusions of the less soluble metals; adding to such residual precipitate a solution containing a soluble iron salt in an amount greater than the chemical equivalent of the copper; agitating the resulting mixture until the copper is substantially dissolved out; and then separating the final solution and remaining precipitate and purifying the former.

13. In a process of separating iron, copper, and nickel in the form of precipitates differing slightly in their respective degrees of solubility, such precipitates being more soluble in the order named, the steps which consist in adding to the precipitates a solution containing a soluble iron salt in an amount greater than the chemical equivalent of the nickel; agitating the resulting mixture until the nickel is substantially dissolved out; separating the solution from the residual precipitate; purifying such solution by agitating the same with another portion of the original precipitate; adding to such residual precipitate a solution containing a soluble iron salt in an amount greater than the chemical equivalent of the copper; agitating the resulting mixture until the copper is substantially dissolved out; separating the final solution and remaining precipitate; and purifying such final solution by agitating the same with another portion of such residual precipitate.

14. In a process of separating iron and nickel in the form of basic precipitates, which consists in adding to the precipitates a solution of iron salt, in an amount greater than the chemical equivalent of the nickel; agitating the resulting mixture until the basic nickel precipitate is dissolved out; separating the solution from the residual precipitate; and then purifying such solution of any inclusions of the iron and copper.

15. In a process of separating iron, copper and nickel in the form of basic precipitates, the steps which consist in adding to the precipitates a solution containing a soluble salt of one of the first two metals in an amount greater than the chemical equivalent of the nickel; agitating the resulting mixture until the nickel precipitate is dissolved out; separating the solution from the residual precipitate; purifying the latter of any inclusions of iron and copper; adding to such residual precipitate a solution containing a soluble iron salt in an amount greater than the chemical equivalent of the copper; agitating the resulting mixture until the copper precipitate is substantially dissolved out; separating the final solution and remaining precipitate; and then purifying such final solution of any inclusions of the iron.

16. In a process of separating iron, copper and nickel in the form of precipitates of ferric hydrate and nickel and copper basic carbonates, respectively, the steps which consist in adding to the precipitates a solution containing iron chlorid in an amount greater than the chemical equivalent of the nickel; agitating the resulting mixture until the nickel basic carbonate is dissolved out; separating the solution of nickel chlorid from the residual precipitate; purifying such solution of any inclusions of iron and copper by agitating the same in another portion of the original precipitates; adding to such residual precipitate a solution of iron chlorid in an amount greater than the chemical equivalent of the copper; agitating the resulting mixture until the copper basic carbonate is dissolved out; separating the solution of copper chlorid from the remaining precipitate of ferric hydrate; and then purifying such solution of any inclusions of the iron by agitating the same with another portion of such residual precipitate.

Signed by HERBERT H. Dow, this 28 day of October, 1907.

HERBERT H. DOW.

Attested by:
 THOS. GRISWOLD Jr.,
 CARL W. BENNETT,
 FRED N. LOWRY.

Signed by WALTER S. GATES, this 7 day of October, 1907.

WALTER S. GATES.

Attested by:
 C. J. STROSACKER,
 A. N. PATRIAICHE.